United States Patent
Wiemeyer et al.

(10) Patent No.: US 7,006,799 B2
(45) Date of Patent: Feb. 28, 2006

(54) ENERGY SAVING MOTOR-DRIVEN LOCKING SUBSYSTEM

(75) Inventors: James F. Wiemeyer, Homer Glen, IL (US); Zhen Liu, South Elgin, IL (US)

(73) Assignee: Harrow Products LLC, Montvale, NJ (US)

(*) Notice: Subject to any disclaimer, the term of this patent is extended or adjusted under 35 U.S.C. 154(b) by 584 days.

(21) Appl. No.: 10/262,207

(22) Filed: Sep. 30, 2002

(65) Prior Publication Data

US 2003/0100266 A1 May 29, 2003

Related U.S. Application Data

(60) Provisional application No. 60/326,338, filed on Sep. 30, 2001, provisional application No. 60/326,299, filed on Sep. 30, 2001, provisional application No. 60/326,201, filed on Sep. 30, 2001, provisional application No. 60/326,316, filed on Sep. 30, 2001, provisional application No. 60/326,298, filed on Sep. 30, 2001, provisional application No. 60/326,179, filed on Sep. 30, 2001, provisional application No. 60/326,296, filed on Sep. 30, 2001, provisional application No. 60/326,294, filed on Sep. 30, 2001, and provisional application No. 60/326,295, filed on Sep. 30, 2001.

(51) Int. Cl.
*H04B 17/00* (2006.01)

(52) U.S. Cl. .................. 455/67.11; 455/574; 455/41.2; 340/825.54; 318/480

(58) Field of Classification Search ............... 455/572, 455/67.11, 414.1, 41.1, 41.2, 66.1, 67.13, 455/74, 556.1, 554.2, 574, 90.3; 340/825.54, 340/825.34, 10.1, 10.31, 10.42, 10.51, 10.52, 340/330, 286.11, 49.6; 318/480, 266, 282, 318/286; 235/491, 492

See application file for complete search history.

(56) References Cited

U.S. PATENT DOCUMENTS

| 4,357,601 A | 11/1982 | McWilliams |
| 4,672,365 A | 6/1987 | Gehman et al. |
| 5,019,803 A | 5/1991 | Maram |

(Continued)

FOREIGN PATENT DOCUMENTS

| FR | 2749607 | 12/1997 |
| WO | WO 02/25040 | 3/2002 |

OTHER PUBLICATIONS

"Circuit Design for Electronic Instrumentation" by Darold Wobschall, pp. 367–369.

*Primary Examiner*—Pablo N. Tran
(74) *Attorney, Agent, or Firm*—Michael Best & Friedrich LLP

(57) ABSTRACT

In an access control system, a method and system for conserving battery life comprising an electronic control processor in a motor-driven locking subsystem for measuring samples of back electromotive force from a DC motor within the motor-driven locking subsystem. The samples of the back electromotive force are summed by the electronic control processor to form a comparison parameter value. The comparison parameter value is compared to a predetermined threshold value to form a decision parameter. An action is taken by the electronic control processor in the motor-driven locking subsystem based on the decision parameter. This action comprises one of commanding the battery source in the motor-driven locking subsystem to increase the voltage level to the motor, generating a fail signal, or detecting and indicating a lock or unlock condition.

20 Claims, 6 Drawing Sheets

U.S. PATENT DOCUMENTS

| | | | |
|---|---|---|---|
| 5,075,608 A | * 12/1991 | Erdman et al. | 318/599 |
| 5,184,349 A | 2/1993 | Riordan | |
| 5,418,839 A | 5/1995 | Knuth et al. | |
| RE35,124 E | * 12/1995 | Erdman et al. | 318/599 |
| 5,491,471 A | 2/1996 | Stobbe | |
| 5,497,411 A | 3/1996 | Pellerin | |
| 5,577,229 A | 11/1996 | Wakerly | |
| 5,682,135 A | 10/1997 | Labonde | |
| 5,774,059 A | 6/1998 | Henry et al. | |
| 5,808,296 A | 9/1998 | McMonagle et al. | |
| 5,812,782 A | 9/1998 | Jackson | |
| 5,847,662 A | * 12/1998 | Yokota et al. | 340/10.34 |
| 5,867,095 A | 2/1999 | Klein et al. | |
| 5,884,145 A | 3/1999 | Haartsen | |
| 5,901,361 A | 5/1999 | Luong | |
| 5,936,544 A | 8/1999 | Gonzales et al. | |
| 5,974,367 A | 10/1999 | Bianco | |
| 6,167,251 A | 12/2000 | Segal et al. | |
| 6,185,415 B1 | 2/2001 | Boatwright | |
| 6,237,028 B1 | 5/2001 | Jackson | |
| 6,260,392 B1 | 7/2001 | Geiger | |
| 6,326,754 B1 | * 12/2001 | Mullet et al. | 318/480 |
| 6,352,202 B1 | * 3/2002 | Takiguchi et al. | 235/451 |
| 6,359,547 B1 | 3/2002 | Denison et al. | |
| 6,377,608 B1 | 4/2002 | Zyren | |
| 6,392,537 B1 | 5/2002 | Tazumi et al. | |
| 6,776,332 B1 | 8/2004 | Allen et al. | |
| 2001/0021639 A1 | * 9/2001 | Kaku | 455/41 |
| 2001/0055283 A1 | 12/2001 | Beach | |
| 2002/0163430 A1 | 11/2002 | Bergman et al. | |
| 2003/0025082 A1 | 2/2003 | Brewington et al. | |
| 2003/0096607 A1 | 5/2003 | Taylor | |
| 2003/0098778 A1 | 5/2003 | Taylor et al. | |
| 2003/0098779 A1 | 5/2003 | Taylor et al. | |
| 2003/0100266 A1 | 5/2003 | Wiemeyer et al. | |
| 2003/0103472 A1 | 6/2003 | Taylor et al. | |
| 2003/0143956 A1 | 7/2003 | Taylor | |
| 2004/0236547 A1 | 11/2004 | Rappaport et al. | |
| 2005/0003812 A1 | 1/2005 | Gladwin et al. | |

* cited by examiner

ENERGY SAVING MOTOR-DRIVEN LOCKING SUBSYSTEM

RELATED APPLICATIONS

The present application claims priority to the following provisional applications all filed Sep. 30, 2001: Application No. 60/326,338, Entitled "Rf Channel Linking Method And System"; Application No. 60/326,299, Entitled "Energy Saving Motor-Driven Locking Subsystem"; Application No. 60/326,201 Entitled "Cardholder Interface For An Access Control System"; Application No. 60/326,316, Entitled "System Management Interface For Radio Frequency Access Control"; Application No. 60/326,298 Entitled "Power Management For Locking System"; Application No. 60/326,179, Entitled "General Access Control Features For A Rf Access Control System"; Application No. 60/326,296, Entitled "Rf Wireless Access Control For Locking System"; Application No. 60/326,294, Entitled "Maintenance/Trouble Signals For A Rf Wireless Locking System"; And Application No. 60/326,295, Entitled "Rf Dynamic Channel Switching Method."

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The preferred embodiments of the present invention relate to an RF access control system for controlling access to an access point. More specifically, the preferred embodiments of the present invention relate to a method and system for driving a motor of a motor-driven locking subsystem of an access control system in such a way as to save battery power of the motor-driven locking subsystem and ensure security.

A wireless access control system may provide several advantages over a traditional, wire-based access control system. In a traditional, wired access control system, each access point, such as a door, for example, is equipped with a locking module to secure the access point. Each locking module is in turn directly wired to a remote access control module. The access control module is typically a database that compares a signal received from the locking module to a stored signal in the database in order to determine an access decision for that locking module. Once the access decision has been determined by the access control module, the decision is relayed to the locking module through the wired connection.

The use of wired connections between the access control module and the locking module necessitates a large investment of time and expense in purchasing and installing the wires. For example, for larger installations, literally miles of wires must be purchased and installed. An access control system that minimizes the time and expense of the installation would be highly desirable.

Additionally, wire-based systems are prone to reliability and security failures. For example, a wire may short out or be cut and the locking module connected to the access control module by the wire may no longer be under the control of the access control module. If a wire connection is cut or goes, the only alternative is to repair the faulty location (which may not be feasible) or run new wire all the way from the access control module to the locking module, thus incurring additional time and expense. Conversely, an access control system that provides several available communication channels between the locking module and the access control module so that if one communication channel is not usable, communication may proceed on one of the other communication channels, would also be highly desirable, especially if such an access control system did not add additional costs to install the additional communication channels.

A wireless access system providing a wireless communication channel between the locking module and the access control module may provide many benefits over the standard, wire-based access control system. Such a wireless access system is typically less expensive to install and maintain due to the minimization of wire and the necessary installation time. Additionally, such a system is typically more secure because communication between the locking module and the access control module is more robust that a single wire.

However, one difficulty often encountered in installing and maintaining such a wireless access system is providing power to the individual, remote locking modules. For example, such locking modules may be powered by battery, but standard locking modules for wire-based access control systems are typically quite wasteful of power, a commodity in short supply in wireless access systems. Consequently, a motor driving the locking mechanism of the locking module that is power efficient is highly desirable.

Typically, the motor of a battery powered locking subsystem is driven at or near full power until the locking mechanism is fully locked or fully unlocked. The conditions of being fully locked or fully unlocked are typically detected by some mechanical or electro-mechanical feedback such as a conventional limit switch. This type of feedback mechanization adds components and cost to the subsystem. Driving the motor in this way requires a great deal of stored energy to lock and unlock the mechanism. This drains the battery at a fast rate, yielding a reduced number of times that a door with such a locking mechanism may be locked and unlocked before the battery needs to be changed or recharged.

Consequently, a simple, cost effective approach to driving the motor of a battery powered locking subsystem in such a fashion as to conserve battery life would be highly desirable.

BRIEF SUMMARY OF THE INVENTION

One aspect of the disclosed embodiment is a method and system for conserving battery life in an access control system. This disclosed embodiment comprises an electronic control processor in a motor-driven locking subsystem for measuring samples of back electromotive force from a DC motor within the motor-driven locking subsystem. The samples of the back electromotive force are summed by the electronic control processor to form a comparison parameter value. The comparison parameter value is compared to a pre-determined threshold value to form a decision parameter. An action is taken by the electronic control processor in the motor-driven locking subsystem based on the decision parameter. This action comprises one of commanding the battery source in the motor-driven locking subsystem to increase the voltage level to the motor, generating a fail signal, or detecting and indicating a lock or unlock condition. These and other features of the disclosed embodiment are discussed in the following detailed description of the disclosed embodiment.

DETAILED DESCRIPTION OF THE INVENTION

The present application is directed toward a portion of a wireless access system. Additional disclosure of the wireless access system may be found in the following co-filed applications which are hereby incorporated by reference in their entirety: application Ser. No. 10/261,933, entitled "RF Channel Linking Method and System" filed Sep. 30, 2002; application Ser. No. 10/262,207, entitled "Energy Saving Motor-Driven Locking Subsystem" filed Sep. 30, 2002; application Ser. No. 10/262,509, entitled "Cardholder Interface for an Access Control System" filed Sep. 30, 2002; application Ser. No. 10/262,196, entitled "System Management Interface for Radio Frequency Access Control" filed Sep. 30, 2002; application Ser. No. 10/262,194, entitled "Power Management for Locking System" filed Sep. 30, 2002; application Ser. No. 10/262,507, entitled "General Access Control Features for a RF Access Control System" filed Sep. 30, 2002; application Ser. No. 10/262,077, entitled "RF Wireless Access Control for Locking System" filed Sep. 30, 2002; application Ser. No. 10/262,508, entitled "Maintenance/Trouble Signals for a RF Wireless Locking System" filed Sep. 30, 2002; and application Ser. No. 10/262,249, entitled "RF Dynamic Channel Switching Method" filed Sep. 30, 2002.

Figure 1:
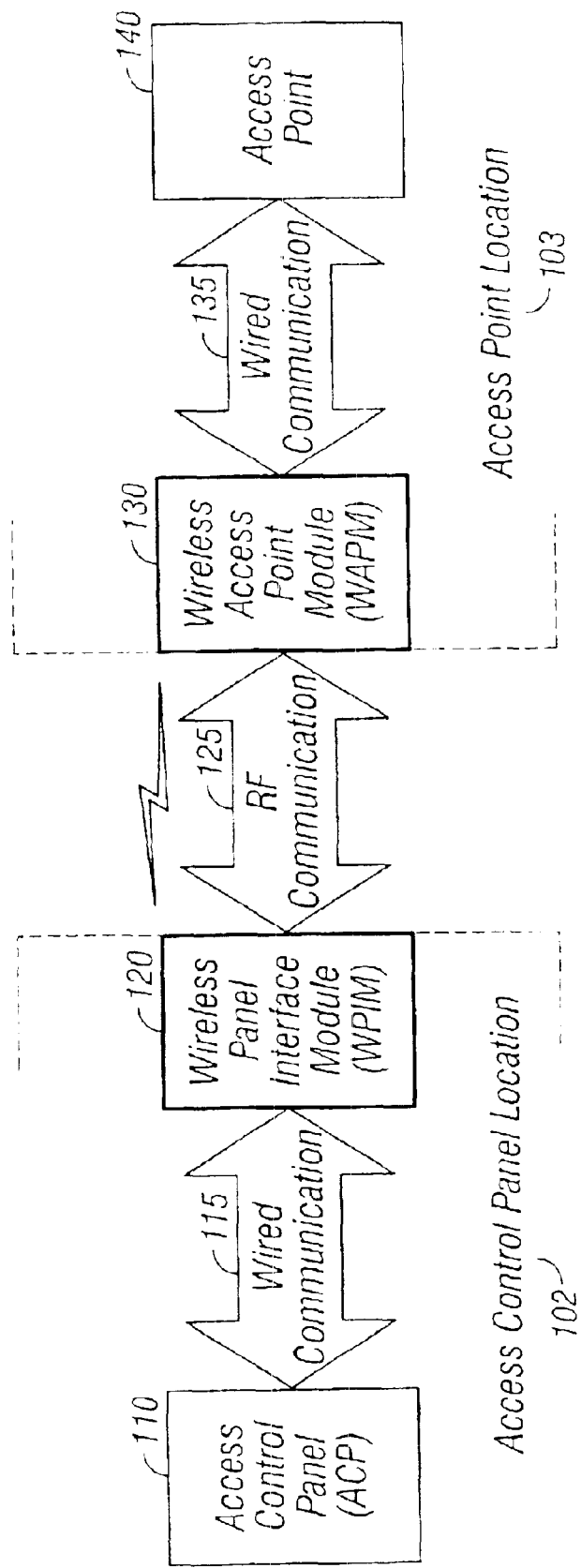
FIG. 1 illustrates a block diagram of the components of a wireless access system according to a preferred embodiment of the present invention.

FIG. 1 illustrates a block diagram of the components of a wireless access system 100 according to a preferred embodiment of the present invention. The wireless access system 100 includes several components installed at one of two generalized locations, an access control panel location 102 and an access point location 103. The access control panel location 102 includes an access control panel (ACP) 110 and a Wireless Panel Interface Module (WPIM) 120. The access point location 103 includes a Wireless Access Point Module (WAPM) 130 and an access point 140. The access control panel 110 communicates with the WPIM 120 through a bi-directional wired communication link 115. The WPIM 120 communicates with the WAPM 130 through a bi-directional RF communication link 125. The WAPM 130 communicates with the access point 140 through a bi-directional wired communication link 135. The access point 140 is preferably a door or portal, but may be a container, secure location, or a device of some kind, for example.

In operation, an access signal is read at the access point 140. The access signal may be a signal from an access card, for example, a magnetic stripe or Wiegand access card. Alternatively, the access signal may be a biometric or a numeric sequence or some other access signal. The access signal is relayed from the access point 140 to the WAPM 130 through the wired communication link 135. As further described below, the access point 140 may be integrated into the WAPM 130 to form a single component or may be a separate component wired to the WAPM 130.

Once the WAPM 130 receives the access signal from the access point 140, the WAPM 130 transmits the access signal to the WPIM 120 over the RF communication link 125. The WPIM 120 receives the access signal and relays the access signal to the ACP 110 over the wired communication link 115.

Figure 2:
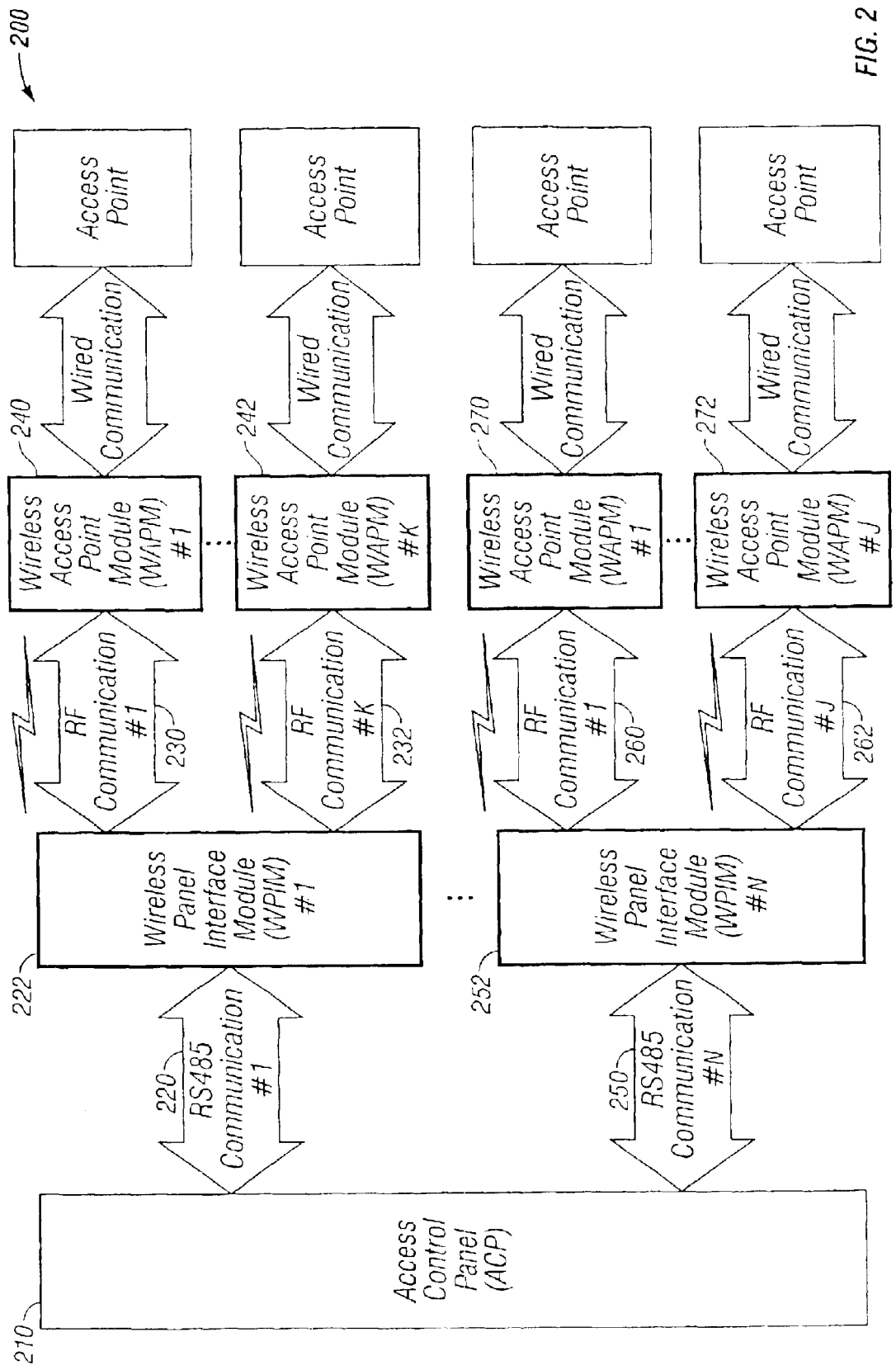
FIG. 2 illustrates a block diagram of the components of an expanded wireless access system according to a preferred embodiment of the present invention.

FIG. 2 illustrates a block diagram of the components of an expanded wireless access system 200 according to a preferred embodiment of the present invention. The expanded wireless access system 200 includes an ACP 210, multiple wired communication links 220, 222 numbered 1 to N, multiple WPIMs 222, 252 numbered 1 to N, multiple RF communication links 230, 2323, 260, 262 numbered 1 to K and 1 to J, and multiple WAPMs 240, 242, 270, 272 numbered 1 to K and 1 to J. The expanded wireless access system 200 is similar to the access system 100 of FIG. 1, and includes the same components, but has been expanded to include multiple access points, WAPMs, and WPIMs.

In the expanded wireless access system 200, a single ACP 210 communicates with a number N of WPIMs 222, 252 over a number N of wired communication links 220, 250. That is, the ACP supports communication with and provides access decisions for plurality of WPIMs 222, 252. Each WPIM 222, 252 may in turn support a plurality of WAPMs 240, 242, 270, 272 each WAPM positioned at a single access point. For example, WPIM #1 communicates with a number K of WAPMs 240, 242 over a number K of RF communication links 230, 232. Additionally, WPIM #N communicates with a number J of WAPMs 270, 272 over a number J of RF communication links 260, 262.

In a preferred embodiment, the ACP 210 supports three WPIMs and each PIM can support up to six WAPMs. However, as more advanced and configurable systems are developed, the total numbers of WPIMs and WAPMs supported is expected to rise. Additionally, the N wired communication links 220, 250 are illustrated as the preferred embodiment of RS486 communication links. Alternatively, other well-known communication protocols may be employed.

Figure 3:
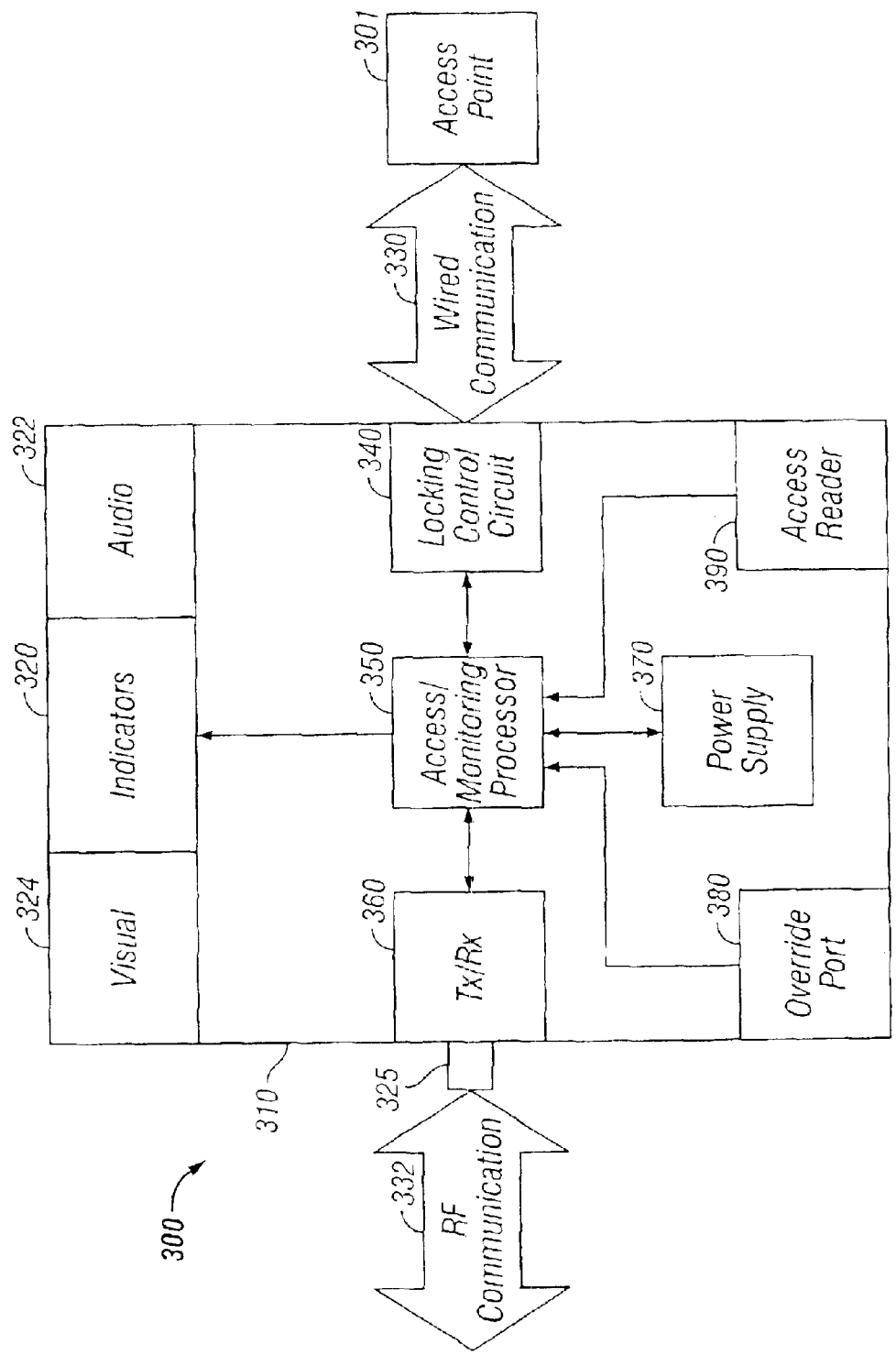
FIG. 3 illustrates a Wireless Access Point Module (WAPM) for the wireless access system of FIG. 1 according to a preferred embodiment of the present invention.

FIG. 3 illustrates a Wireless Access Point Module (WAPM) 300 for the wireless access system 100 of FIG. 1 according to a preferred embodiment of the present invention. The WAPM 300 includes a housing 310, indicators 320, a wired communication link 330, a RF communication link 332, and an antenna 325. The housing 310 includes a locking control circuit 340, an access/monitoring processor 350, a transceiver 360, a power supply 370, an override port 380, and an access reader 390. The indicators 320 may include one or both of an audio indicator 322 and a visual indicator 324. An access point 301 is also shown in FIG. 3.

The power supply 370 provides power to all of the other systems of the housing 310, including the transceiver 360, the locking control circuit 340, and the access/monitoring processor 350. The power supply 370 may be an internal battery or other internal type of power supply. Alternatively, an AC power supply may be employed. The transceiver 360 is coupled to the antenna 325 to allow signals to be sent and received from the housing 310 to an external point such as a WPIM through the RF communication link 332. The locking control circuit 340 is coupled to the access point 301 and provides locking control signals to the access point 301 through the wired communication link 330. Additionally, the locking control circuit 340 may receive feedback from the access point 301 through the wired communication link 330, for example to verify that the access point is secured. The access reader 390 receives access signals such as from an integrated card reader or other access device, for example. The indicators 320 may provide a visual or audio indication, for example, of the state of the WAPM 300 or that an access signal has been read by the access reader 390.

In operation, an access signal may be received from the access reader 390. The access signal is then relayed to the access/monitoring processor 350. The access/monitoring processor 350 then sends the access signal to the transceiver 360. The transceiver 360 transmits the access signal to WPIM 120 of FIG. 1 that is interfaced to the ACP 110. As further explained below, the ACP 110 includes a database of authorized access signals. If the access signal received from the WAPM 300 is determined by the ACP 110 to be a signal corresponding to an authorized user, a confirmation is transmitted from the ACP 110 to the WPIM 120 and then to the transceiver 360 of the WAPM 300. The confirmation is relayed from the transceiver 360 to the access/monitoring processor 350. The access/monitoring processor 350 then sends a locking control signal to the locking control unit 340. When the locking control unit 340 receives the locking control signal, the locking control unit 340 activates the access point 301 through the wired communication link 330 to allow access. The indicators 320 may be a visual or audible signal that the housing 310 has read an access signal, transmitted the access signal to the remote access control panel, received a confirmation, or activated the locking member, for example.

The WAPM 300 may include several variations. For example, the WAPM may be an Integrated Reader Lock (IRL), a Wireless Reader Interface (WRI), a Wireless Integrated Strike Interface (WISI), a Wireless Universal Strike Interface (WUSI), or a Wireless Portable Reader (WPR). The IRL includes an integrated access reader and lock. That is, the IRL is similar to FIG. 3, but includes the access point as part of the housing. The WRI is similar to the IRL, but does not include an integrated access reader and instead receives signals from a third party access reader. The WISI includes an integrated reader and lock and is mounted directly into the strike of the access point, such as a door, for example. The WUSI is similar to the WISI, but does not include an integrated reader and lock and may instead be connected to a third party reader and/or lock. The WPR is a portable reader that may be taken to a remote location and determine access decisions at the remote location, for example, for security checks or badging checks.

Figure 4:
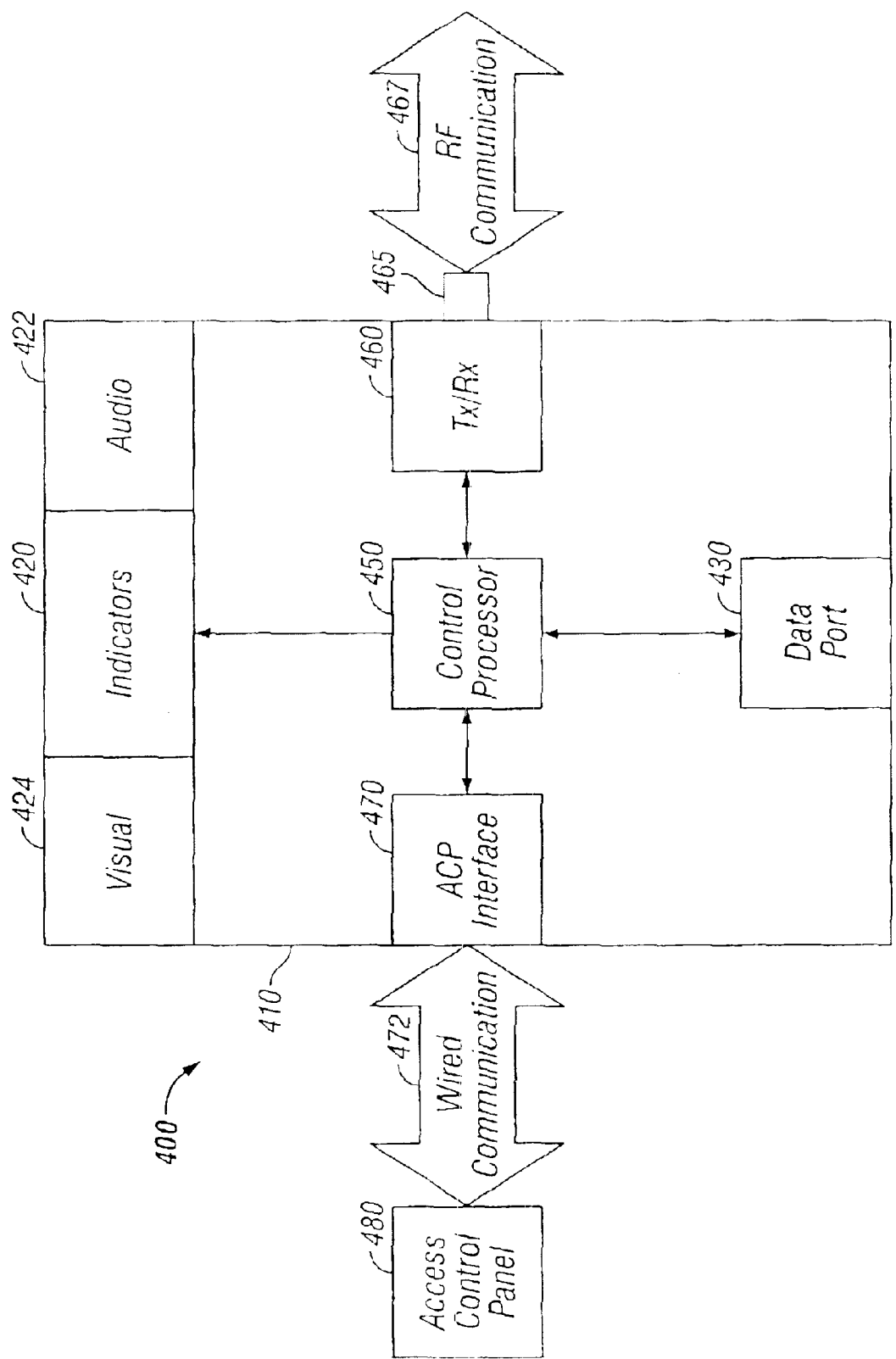
FIG. 4 illustrates a WPIM for the wireless access system of FIG. 1 according to a preferred embodiment of the present invention.

FIG. 4 illustrates a WPIM 400 for the wireless access system 100 of FIG. 1 according to a preferred embodiment of the present invention. The WPIM 400 includes a housing 410, an antenna 465, and indicators 420. The housing 410 includes a data port 430, a control processor 450, a transceiver 460 and an ACP interface 470. FIG. 4 also shows an RF communication link 467, a wired communication link 472, and an ACP 480.

Power is typically supplied to the WPIM via an AC power supply or through the wired communication 472. The transceiver 460 is coupled to the antenna 465 to allow signals to be sent and received from the housing 410 to an external point such as a WAPM through the RF communication link 467. The ACP 480 is coupled to the WPIM 400 through the wired communication link 472. The data port 430 is coupled to the control processor 450 to allow an external user such as a technician, for example, to interface with the control processor. The indicators 420 may provide a visual or audio indication, for example of the state of the WPIM 400 or that an access signal has been passed to the ACP 480 or an authorization passed to a WAPM 300.

In operation, the WPIM 400 receives access signals from the WAPM 300 through the antenna 465 and transceiver 460. The WPIM relays the access signals to the ACP 480 for decision making. Once the access decision has been made, the ACP 480 transmits the access decision through the wired communication link 472 to the WPIM 400. The WPIM 400 then transmits the access decision to the WAPM 300.

As mentioned above, the WPIM 400 includes a data port 430. The data port 430 is preferably an RS485 port. The data port 430 may be used, for example, by an operator to connect a computer to the WPIM 400 to perform various tasks, such as configuring the WPIM 400, for example. Some exemplary WPIM items for configuration include the transmission frequency for the communication link with the WAPM and the performance of the indicators 420.

Additionally, configuration information may be received by the data port 430 of the WPIM 400 and relayed to the WAPM 300 via the transceiver 460. The configuration information that is received by the WAPM 300 may then by relayed to the access/monitoring processor 350 of the WAPM 300 for implementation at the WAPM 300.

The WPIM may include several variations including a panel interface module (PIM) and a panel interface module expander (PIME). As mentioned above, a single PIM may communicate with multiple WAPMs. Additionally, the housing for the PIM is preferably constructed to allow additional PIM modules to be installed in the PIM housing to form the PIME. Because the PIME includes multiple PIM modules, the PIME may service more access points.

The features of one of the preferred embodiments present a method and system for conserving battery life in an access control system. Thus, one aspect of a preferred embodiment of the present invention is an access system that employs the momentum of a moving element to complete a locking operation instead of relying on additional battery resources. The preferred embodiments thus also present a novel way of sensing the angular position of a locking mechanism and using the angular position to control a locking operation.

The exemplary discussion below focuses on the use of the wireless access system 100 of FIG. 1 configured to provide access through a door. Although the access point below is presented as a door, it is only one example of the possible access points.

Figure 5:
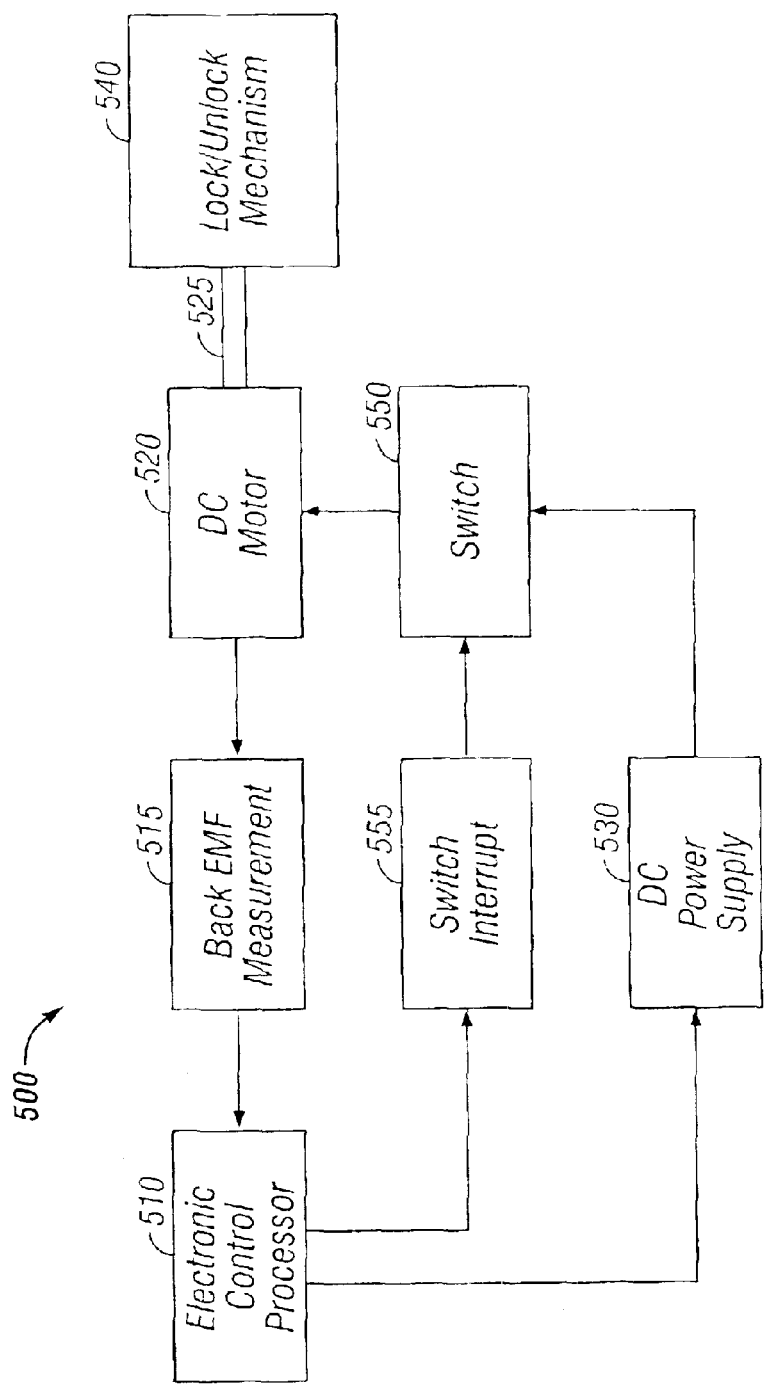
FIG. 5 is a schematic block diagram of a motor-driven locking subsystem 500 according to a preferred embodiment of the present invention.

FIG. 5 is a schematic block diagram of a motor-driven locking subsystem 500 according to a preferred embodiment of the present invention. The motor-driven locking subsystem 500 includes an electronic control processor 510, a DC motor 520, a DC power supply 530, a lock/unlock mechanism 540, and a switch 550. FIG. 1 also includes a back EMF measurement 515, a switch interrupt 555, and a locking shaft 525.

The DC motor 520 is connected to the lock/unlock mechanism 540 by a locking shaft 525. The DC motor 520 is preferably a fractional horsepower, permanent magnet motor. In the motor-driven locking subsystem 500, the fractional horsepower, DC, permanent magnet motor 520 is used to actuate the lock/unlock mechanism 540. The DC motor 520 is driven by a voltage level from the DC power supply 530. The voltage level of the DC power supply 530 is controlled by the electronic control processor 510. The electronic control processor 510 interfaces to the DC motor 520 in order to sense back electromotive force (EMF) 515 from the DC motor 520. The switch interrupt 555 may be used for controlling the switch 550. For example, the switch interrupt 555 may be used to cause power to cease being applied from the DC power supply 530 through the switch 550 to the DC motor 520.

The permanent magnet DC motor comprises a set of permanent magnets which provide a magnetic field flux and a conductor for carrying a DC current. When a voltage is applied to the electrical terminals of the DC motor, a DC current is generated in the conductor. The conductor is oriented such that the magnetic field flux exerts a force on the current carrying conductor. The conductor is arranged as a movable, rotating armature connected to a shaft. As long as a DC current is present in the conductor, the armature and shaft drives the load, that is, delivers torque or force to the load wherein the load is the lock/unlock mechanism and shaft. If the direction of the DC current is reversed, the armature and shaft attempt to rotate in the opposite direction.

The DC motor 520 moves the lock/unlock mechanism 540 from an unlocked condition to a locked condition or vice versa. When a voltage level is applied to the DC motor 520, the shaft 525 of the DC motor 520 rotates, unless the DC motor 520 is stalled. This rotational motion provides a torque to the lock/unlock mechanism 540 and may change the condition of the lock/unlock mechanism 540 between a locked condition or unlocked condition. The electronic control processor 510 controls both the polarity and level of the voltage that gets applied to the DC motor 520 by the DC power supply 530. The polarity and voltage applied are controlled through switching elements in the switch 550. When a lock condition is desired, a positive polarity voltage is applied to the DC motor 520 causing the shaft 525 of the DC motor 520 to rotate in a first direction. When an unlock condition is desired, a negative polarity voltage is applied to the DC motor 520 causing the shaft 525 to rotate in a second direction that is opposite to the first direction.

In the DC motor 525, an induced back electromotive force (EMF) is created as the conductor rotates through the magnetic field according to Faraday's law of induction. The back EMF is proportional to the rate of rotation of the motor and is a voltage that appears between the open circuit terminals of the DC motor 520 when the shaft 525 is rotating.

In a preferred embodiment, the electronic control processor 510 of the motor-driven locking subsystem 500 commands an unlock condition in response to a user input, such as a user entering a numerical code to the access control system to gain entry through a doorway. The command results in the DC power supply 530 providing a DC voltage level to the DC motor 520 for a pre-defined time interval. For example, the voltage level may be approximately 3.3 VDC for about 900 ms or 5 VDC for 600 ms. However, the actual voltage and time intervals applied vary with the type of locking system, motors, and other components. The applied DC voltage level causes the shaft 525 of the DC motor 520 to rotate such that the lock/unlock mechanism 540 begins to move towards an unlock condition.

After the pre-defined time interval, the electronic control processor 510 commands the DC power supply 530 to remove the DC voltage level from the DC motor 520.

With the DC voltage removed from the DC motor 520, the shaft 525 is still rotating or coasting for a period of time because of the angular momentum of the shaft 525. As the shaft 525 is still rotating with the DC voltage removed, the electronic control processor 510 samples the back EMF from the DC motor at a pre-defined sampling rate. Preferably, the sampling rate is once every 10 ms. However, a shorter or longer sampling rate may be employed. Preferably samples are taken often enough to average out the system noise, for example, noise due to interference.

The electronic control processor 510 generates a cumulative sum of the back EMF samples as they are accumulated and compares this sum to a threshold value. When the cumulative sum exceeds the threshold value, the electronic control processor 510 generates a flag indicating that the lock/unlock mechanism 540 is in the unlock condition. Additionally, when the cumulative sum exceeds the threshold value, the motor 520 is no longer driven. In other words, when the cumulative sum exceeds the threshold value, this means that the shaft 525 has rotated a sufficient angular displacement to fully move the lock/unlock mechanism 540 to the unlocked position. The user is now free to open the door and enter the secure area.

If the threshold value is not exceeded by the cumulative sum, then the electronic control processor 510 commands the DC power supply 530 to again apply a voltage level to the DC motor 520 for some period of time in an attempt to force the lock/unlock mechanism 540 to the unlock condition. The voltage and time applied are preferably 3.3 VDC or 5 VDC, as described above. The time period for application of the voltage is preferably until the next EMF reading, or around 10 ms.

If the threshold value is still not exceeded after the additional application of the voltage level to the DC motor, then the electronic control processor 510 continues to attempt to drive the DC motor 520, but may eventually command a failure to be indicated to the user by, for example, displaying a red light (LED) to the user. The locking system preferably continues to attempt to achieve the unlock condition for around one second, but other failure determination time or time-out time may be employed.

By removing the DC voltage level from the DC motor 520 before the lock condition is reached, the energy due to the angular momentum of the shaft and its load 525 is used to complete the task of locking the lock/unlock mechanism 540, instead of requiring the application of additional power to the DC motor 520. Thus, power from the DC power supply 530 may be conserved, extending the life of the DC power supply 530.

In an alternative embodiment, the electronic control processor 510 includes two thresholds. The first threshold is a shut-off threshold and the second threshold is a condition-reached threshold. As described above, the electronic control processor 510 drives the DC motor 520 until the shut-off threshold has been reached. At the shut-off threshold, the electronic control processor 510 ceases driving the DC motor 520. Even though the electronic control processor 510 is no longer driving the DC motor 520, the momentum of the shaft 525 and its load cause the shaft 525 to continue moving. As the shaft continues moving, the back EMF measurement 515 of the DC motor is determined and summed and compared to the second threshold, the condition-reached threshold. The back EMF measurement 515 may thus be used to determine the location of the shaft 525 and consequently to determine whether a door is locked or unlocked, for example. The condition-reached threshold corresponds to a determination that the desired condition has been achieved. For example, if the door is currently locked and an unlocked condition is desired, the condition-reached threshold is indicative that the shaft 525 has traveled far enough to unlock the door. The electronic control processor 510 is also able to determine from the back EMF measurement if the shaft 525 has stopped moving.

If the shaft 525 stops moving after the shut-off threshold but before the condition-reached threshold, the electronic control processor 510 again causes power to be supplied to the DC motor 520 to drive the shaft 525. The power supplied to the DC motor 520 is preferably at the same power level as the initial driving, but may take place at a greater or lesser power. Additionally, the time during which power is supplied to the DC motor 520 is typically much less than the initial driving time. Typically, the shaft 525 is close to reaching the condition-reached threshold, so preferably not much additional power is needed or applied.

The electronic control processor 510 may continue to cause pulses of power to be applied to the DC motor 520 in order to cause the position of the shaft 525 (as determined by the back EMF measurement 515) to reach the condition-reached threshold. However, the electronic control processor 510 preferably only causes pulses of power to be supplied to the DC motor 520 for a limited time. For example, a set number of pulses such as up to 10 additional pulses may be employed. Alternatively, power may be supplied once the shaft 525 stops moving for a time-out period of up to one second, for example.

If the condition-reached threshold has not been achieved after the time-out period has been reached or the maximum number of pulses have been applied, the electronic control processor 510 preferably indicates a failure condition. Additionally, the electronic control processor 510 (which is located at the access point 140 of FIG. 1) preferably sends an error message to the access control panel 110. The error message preferably indicates that the particular access point is experiencing trouble so that maintenance may be dispatched to fix the access point 140 and/or security may be dispatched to monitor the access point 140.

The shut-off threshold may be configured at the factory, during installation, or may be self-updating at the locking subsystem 500. For example, the electronic control processor 510 may record the amount of time and power necessary to open and close the door and update the shut-off threshold to comply with the most recent data or a statistical combination of the most recent data. The condition-reached threshold is typically not updated because the access point fixture preferably does not change.

While a locking operation may employ one set of shut-off and condition-reached thresholds, an unlocking operation may employ a different set of shut-off and condition-reached thresholds. For example, it may be easier to retract the shaft 525 than to drive the shaft 525 due to friction in the mechanism, friction with a door fixture, lubrication conditions, or other reason. Consequently, the total power necessary to achieve an unlocked state may be less than the total power necessary to achieve a locked state. Additionally, the shaft 525 may have different coasting times after power is no longer supplied to the DC motor 520. Thus, a different set of shut-off and condition-reached thresholds are preferably associated with each of the locking and unlocking operations.

For example, once the door has been opened and then closed by the user, or after a certain pre-defined time interval, the lock/unlock mechanism 540 may be driven, in a similar manner as above described, from the unlock condition to the lock condition, thus locking the door. For example, the electronic control processor may include a timer that times out after approximately 3 seconds and locks the door via the motor. Locking the door is accomplished by the electronic control processor 510 commanding the reversing of the polarity from the DC power supply 530 to the DC motor 520 and applying a reversed polarity voltage level to the DC motor 520.

The system then proceeds generally as before, except in reverse. That is, the back EMF voltage measurements 515 are summed and compared to a threshold to determine the position and momentum of the locking shaft 525. Again, as above, once the threshold has been reached, power is no longer supplied from the DC battery supply 530 to the DC motor 520. Once power is no longer applied, the angular momentum of the locking shaft 525 completes the motion of the locking shaft 525 into the unlocked condition.

Alternatively, the lock/unlock mechanism may be spring loaded, magnetically loaded, or arranged in some other manner such that the lock condition is accomplished mechanically instead of by driving the DC motor 520. The electronic control processor 510 then simply controls the other lock actuation mechanism. Also, alternatively, the lock/unlock mechanism may be equipped with a default condition wherein the door is typically in one state and power must be supplied to remove the door from that state. If power is lost, the door merely stays in that state. For example, the door may be biased with springs or magnets to remain locked unless actuated by the electronic control processor 510.

For example, another alternative is to sample the back EMF for a period of time before the DC voltage level is removed from the DC motor 520. Various combinations of sampling and summing the back EMF over various time intervals while the DC voltage is applied and/or removed may be configured. That is, the back EMF measurements 515 may start to be taken from the time that the DC motor 520 is first being driven up until the time that the DC motor 520 is shut off. Sampling the back EMF beginning when the DC motor 520 is first activated may provide a more accurate indication of the location of the shaft 525.

For example, multiple shut-off thresholds may be employed for the same shaft 525 depending on various factors. For example, the lubrication for the shaft 525 may typically provide less friction if the shaft 525 has been recently activated. Consequently, the electronic control processor 510 may keep track of the length of time since the last activation of the shaft 525 and impose a different shut-off threshold if the shaft 525 has been recently activated because the lubrication if typically more slippery. Additionally, a different shut-off threshold may be employed based on environmental conditions such as heat and/or humidity. The environmental conditions may be relayed to the electronic control processor 510 by sensors mounted near the shaft 525. Alternatively, the environmental conditionals may be relayed from the access control panel 110 of the FIG. 1 over the access control system to the electronic control processor 510.

Figure 6:
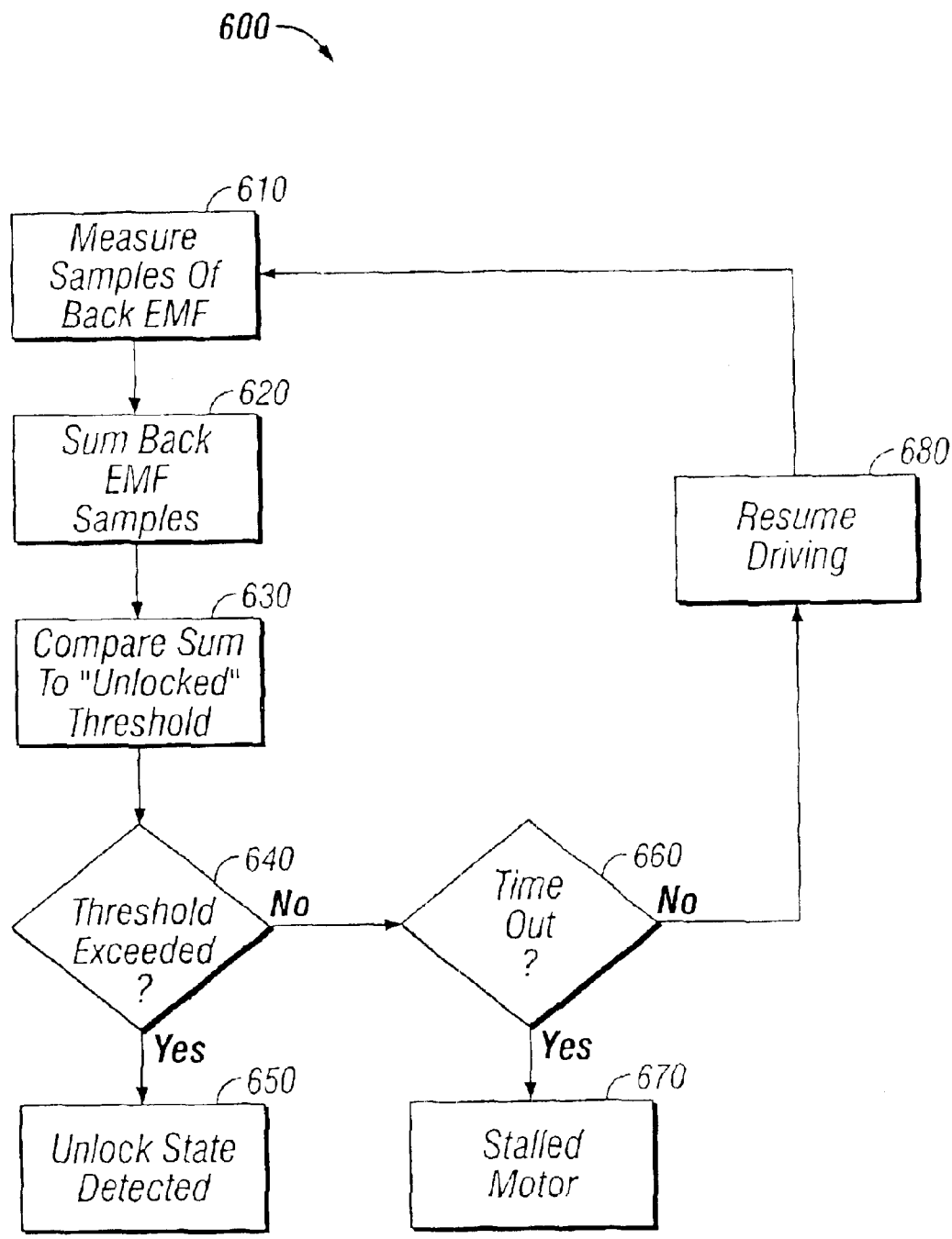
FIG. 6 illustrates a flow chart of one embodiment of the method for conserving battery life in the motor-driven locking subsystem according to a preferred embodiment of the present invention.

FIG. 6 illustrates a flow chart 600 of one embodiment of the method for conserving battery life in the motor-driven locking subsystem according to a preferred embodiment of the present invention. FIG. 6 illustrates the method steps during an unlocking operation, but the locking operation proceeds in generally the same fashion as described above.

In FIG. 6, the locking shaft has been driven by the DC motor for a predetermined period of time. Now, power is no longer being supplied to the DC motor and the locking shaft is coasting using the momentum of the locking shaft and associated load.

First, at step 610, the back EMF of the DC motor is measured. Measurements of the back EMF are preferably received by the electronic control processor. At step 620, the electronic control processor sums the back EMF samples. At step 630 the sum of back EMF samples is compared to the "unlocked" condition, i.e., the unlocked condition-reached threshold. At step 640, if the threshold is exceeded, the door is unlocked and the electronic control processor detects the unlock state at step 650.

If the threshold is not exceeded, the electronic control processor then determines whether the operation has timed out at step 660. For example, as described above, the electronic control process only attempts to resume driving the locking shaft a limited number of times or for a predetermined length of time before determining the motor to be stalled. If the operation has timed out at step 660, the electronic control processor determines that the motor has stalled at step 670. If the operation has not timed out, the electronic control processor resumes driving the motor at step 680 and the flowchart proceeds to step 610.

That is, after the first threshold has been exceeded, the microprocessor in the electronic control processor no longer supplies voltage (power) to the motor, but continues to sample the EMF readings, for example, every 10 ms as described above. When the cumulative sum of the EMF readings exceeds a second threshold, then the microprocessor determines that the motor has translated the locking/unlocking mechanism fully to the opposite state. Thus, coasting or angular momentum is taken into account.

Alternatively, if the sum of the EMF samples does not exceed the threshold, then, at step 680, the voltage supplied to the motor drive is increased. The flowchart then proceeds back to step 610, and the back EMF measurements are again summed and compared to the threshold. If the sum of the back EMF signals still does not exceed the threshold even with the additional voltage supplied to the DC motor 520, then a failure is indicated.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features that come within the spirit and scope of the invention.

What is claimed is:

1. In an RF access control system, a method for reducing the power used to lock or unlock an access point, said access point including a locking shaft, a motor driving said locking shaft and a motor armature, and an electronic control processor controlling said motor; said method including the steps of:

providing power to a motor during an initial drive time so that a locking shaft is set in motion;

ceasing to supply power to said motor;

periodically measuring the back EMF from said motor during a time interval when the motor armature has a substantially zero current value and summing the measurements of said back EMF to form a summed back EMF measurement;

comparing said summed back EMF measurement to a predetermined threshold;

again providing power to said motor if said summed back EMF measurement is less than said predetermined threshold.

2. The method of claim 1 wherein said back EMF is measured every 10 ms.

3. The method of claim 1 wherein said again providing power step includes applying power for around 10 ms.

4. The method of claim 1 wherein said again providing power step includes only providing power for a predetermined plurality of times.

5. The method of claim 4 wherein said again providing power step includes only providing power over a predetermined time period.

6. The method of claim 4 further including the step of indicating a stall of said motor when said predetermined number of times is reached and said threshold has not been met.

7. The method of claim 1 wherein said again providing power step includes providing a power at a different power level than said initial power application.

8. The method of claim 1 further including the step of measuring the back EMF from said motor before ceasing to supply power to said motor to obtain a pre-shutoff back EMF measurement.

9. The method of claim 8 further including the steps of:
  summing the pre-shutoff back EMF measurements to form a summed pre-shutoff back EMF measurement; and
  comparing said summed pre-shutoff back EMF measurement to a predetermined shutoff threshold.

10. The method of claim 9 wherein said ceasing to supply power step is triggered when said summed pre-shutoff back EMF measurement exceeds said predetermined shutoff threshold.

11. An RF access control system including:
  a locking shaft;
  a motor driving said locking shaft so that said locking shaft is set in motion and then ceasing to drive said locking shaft; and
  an electronic control processor periodically measuring the back EMF from said motor when said motor is exhibiting a substantially zero motor current, summing the measurements of said back EMF to form a summed back EMF measurement, comparing said summed back EMF measurement to a predetermined threshold, and re-activating said motor if said summed back EMF measurement is less than said predetermined threshold.

12. The access control system of claim 11 wherein said back EMF is measured every 10 ms.

13. The access control system of claim 11 wherein said motor is reactivated for around 10 ms.

14. The access control system of claim 11 wherein said electronic control processor reactivates said motor for a predetermined plurality of times.

15. The access control system of claim 14 wherein said electronic control processor only reactivates said motor over a predetermined time period.

16. The access control system of claim 14 wherein said electronic control processor indicates a stall of said motor when said predetermined plurality of times is reached and said threshold has not been met.

17. The access control system of claim 11 wherein said motor is reactivated as a different power level that the initial power application.

18. The access control system of claim 11 wherein said electronic control processor measuring the back EMF from said motor before ceasing to supply power to said motor to obtain a pre-shutoff back EMF measurement.

19. The access control system of claim 18 wherein said electronic control processor sums the pre-shutoff back EMF measurements to form a summed pre-shutoff back EMF measurement and compares said summed pre-shutoff back EMF measurement to a predetermined shutoff threshold.

20. The access control system of claim 19 wherein said electronic control processor ceases to provide power to said motor when said summed pre-shutoff back EMF measurement exceeds said predetermined shutoff threshold.

* * * * *